United States Patent Office 3,697,272
Patented Oct. 10, 1972

3,697,272
PROCESS FOR MAKING NON-SILVER FREE RADICAL FILM IMAGES VISIBLE
Lothar Ramins, Cleveland, Ohio, assignor to Horizons Incorporated, a division of Horizons Research Incorporated
No Drawing. Filed June 18, 1971, Ser. No. 154,609
Int. Cl. G03c 5/04
U.S. Cl. 96—27                                5 Claims

ABSTRACT OF THE DISCLOSURE

An improvement over the optical development procedure disclosed in United States Patent 3,510,300 which resides in the use of two separate exposures to radiation of two different wavelengths to develop a visible image from a latent image bearing material, the first exposure being a brief exposure to radiation of relatively shorter wavelength and the second exposure being to relatively longer wavelength radiation.

---

The invention herein described was made in the course of or under a contract or subcontract thereunder, with The Systems Engineering Group, Air Force Systems Command.

The invention relates to the optical development of non-silver free radical photosensitive film and is an improvement on the process disclosed in U.S. Pat. 3,510,300. In the process disclosed in that patent, images which are created by imagewise exposure of non-silver free radical compositions to dosages of radiation which are insufficient to produce a visible image are rendered visible by blanket exposure of the member bearing the latent or faint image to a dose of optical radiation of a suitable wavelength whereby the very faint or even invisible image is intensified or optically developed.

It has now been found that the efficiency and versatility of the process of optical development is greatly improved by using two different wavelengths for the optical development of the latent or faintly visible image bearing free radical film.

By the use of sequential exposure to radiation of two different wavelengths, a number of advantages were achieved, including the following:

(1) Increasing photographic response to the same initial exposure by means of improved development;
(2) Gamma control;
(3) Shortening total processing time; and
(4) Ability to control maximum density from identical primary exposures.

The invention will be more clearly understood from the examples which follow in which preferred embodiments of the invention are set forth by way of illustration and not by way of limitation.

EXAMPLE 1

Following the procedure set forth in U.S. Pat. 3,558,317 and in Photographic Science and Engineering, vol. 5, No. 2, March-April 1961, pages 100, 101, a photosensitive composition was prepared under a safelight by adding each of the following constituents to a mixture of 2 ml. of methylene dichloride and 2.5 ml. of polystyrene (20%) in benzene and stirring until the added constituent had completely dissolved, and then adding the next named constituent:

75 mg. diethyl amino styryl quinoline
50 mg. diphenylamine
100 mg. 2,6-di-tert-butyl phenol
200 mg. iodoform The resulting composition was then coated on a polyethylene terephthalate substrate as described in the same reference, a coating of 0.0015 inch wet thickness being preferred. After the film had "dried," it was exposed through a step tablet to radiation in the 488 nanometer band. It was found that the film could be developed to a net unit density after exposure of 262 ergs/cm.$^2$, and 581 ergs/cm.$^2$ were required for net D=2 with a base plus fog of 0.10 density units (D.U.) using a blanket exposure to radiation with a 2% onset (ascending) of 645 nm. for a period of 600 seconds.

Using a shorter wavelength blanket exposure of 2% onset at 610 nm., this film required 616 ergs/cm.$^2$ for net D=1 and did not achieve net D=2. The film had a base plus fog of 0.22 D.U. and a maximum density of 1.80 D.U. when developed for 47 seconds with this radiation.

However, when a combination of the two wavebands was used consecutively, the shorter being the first, an identical exposure required 32 ergs/cm.$^2$ for net D=1 and 79 ergs/cm.$^2$ for net D=2. The base plus fog was 0.18 D.U., and the maximum density was 2.76 D.U. This development was achieved by a 20 second blanket exposure to the 610 nm. (2% onset) radiation, followed by 300 seconds with the 645 nm. (2% onset) radiation.

It will be apparent that exposure to the longer wavelength alone was not sufficient to develop the image completely, and that the radiation in the shorter wavelength fogged the film rapidly, but that the combination of the two wavelengths could be utilized to develop the image to a greater utilization than possible by either waveband alone.

One possible explanation of this phenomenon is that the photosensitive complex, upon photolysis, produces dye to create a latent image. The shorter waveband development rapidly increases this latent image, but must be attenuated before a significant amount of fog is formed from blanket exposure to non-image areas. The longer waveband is then used to develop the image completely. This longer waveband is generally such that it will not fog the film by itself.

It has also been found that the two waveband development may be employed to shift the gamma of the film. Generally speaking, a short exposure to the lower waveband will result in high gamma values while increasing the length of this exposure will decrease the gamma. This is illustrated in Table I in which the results are for the same formulation as in Example 1, above.

Below is a table to illustrate the phenomenon using the film formulation previously given.

TABLE I

| Sample | Required exposure | | Base plus fog | Maximum density | Gamma | Developing time (seconds) | |
|---|---|---|---|---|---|---|---|
| | Ergs/cm.$^2$ (net D=1) | Ergs/cm.$^2$ (net D=2) | | | | 610 nm. | 645 nm |
| 1 | 93 | 277 | 0.22 | 2.56 | 2.48 | 10 | 307 |
| 2 | 33 | 110 | 0.25 | 2.72 | 2.20 | 15 | 480 |
| 3 | 30 | 117 | 0.28 | 2.69 | 2.03 | 20 | 240 |
| 4 | 34 | 158 | 0.28 | 2.70 | 1.52 | 25 | 132 |
| 5 | 59 | 147 | 0.28 | 2.70 | 2.03 | 30 | 108 |
| 6 | 59 | 259 | 0.40 | 2.60 | 1.65 | 40 | 90 |

It will be noted that while the gamma progressively decreases with increasing 610 nm. exposure, the total development time is also reduced, which is another use of the two waveband concept.

EXAMPLE 2

A similar photosensitive composition was formulated from the following constitutents:

125 mg. diethylaminostyryl quinoline
200 mg. 2,6-di-tert-butyl-phenol
400 mg. iodoform
4.0 ml. 25% polyestyrene in benzene:toluene 1:1

This formulation was wet coated on Mylar polyethylene terephthalate as in Example 1.

Films cut from this coating were given identical exposures to 488 nm. radiation through a step tablet. The table below summarizes the photographic properties of the film as a function of development by blanket exposure to different wavebands (all given as 2% ascending onset in nanometers wavelength).

TABLE II

| Sample | Required exposure Ergs/cm.² (net D=1) | Required exposure Ergs/cm.² (net D=2) | Base plus fog | Maximum density | Gamma | Development 2% onset, nm. | Development Time, sec. |
|---|---|---|---|---|---|---|---|
| 1 | | | 0.60 | 1.26 | 0.63 | 577 | 22 |
| 2 | | | 0.45 | 1.22 | 0.67 | 585 | 24 |
| 3 | | | 0.35 | 1.40 | 0.81 | 595 | 40 |
| 4 | 155 | | 0.40 | 1.80 | 1.53 | 610 | 45 |
| 5 | 57 | | 0.30 | 2.18 | 1.41 | 622 | 95 |
| 6 | 28 | 136 | 0.20 | 2.50 | 2.20 | 645 | 240 |
| 7 | 23 | 200 | 0.16 | 2.20 | 2.33 | 660 | 600 |
| 8 | | | 0.05 | 0.06 | 0.01 | 666 | 1,200 |
| 9 | 18 | 97 | 0.26 | 2.60 | 1.70 | 610 / 660 | 19 / 210 |
| 10 | 22 | 55 | 0.15 | 2.80 | 2.67 | 610 / 666 | 19 / 660 |

It can be seen that the shorter wavebands are not suitable for optical development of this composition because of the high fog levels reached while maximum density is still relatively low. The longer wavebands show good response at net D=1, but fail to develop a high maximum density, which affects the D=2 photographic response measurement.

Combining the two wavebands, as illustrated by samples 9 and 10, gives the best overall properties.

Note that the 666 nm. radiation, which alone only reached 0.01 D.U. net density, when combined with the 610 nm. waveband achieved the highest density recorded on the chart, 2.80 D.U.

The 660 nm. waveband, which took 600 seconds to develop the image, gave better photographic properties in less than half the time when combined with the 610 nm. waveband.

EXAMPLE 3

The following photosensitive formulation was prepared in the same way as that in Example 1 by dissolving the following constituents in $CH_2Cl_2$ (methylene dichloride):

3.5 ml. 15% polycarbonate in $CH_2Cl_2$
1.5 ml. Sucrose-diacetate-hexaiso butyrate solution plasticizer (50 mg. per ml. $CH_2Cl_2$)
10 drops Dow 510 silicone fluid solution wetting agent (1 drop per 10 cc. $CH_2Cl_2$)
150 mg. 1,1-bis-(p-dimethylamino-phenyl)-ethylene
2.5 mg. 3-ethyl-5-[3-ethyl - 2(3H-benzoxazolylidene)-ethylidene]-rhodanine
9.0 mg. 2,5-dimethoxy-4′-aminostibine
175 mg. Iodoform
20 mg. 4-(methylthio)phenol antifoggant
5 mg. 2-mercaptoacetanilide
5 mg. triphenylstilbene The formulation was coated .0015″ (wet thickness) on 500 D Mylar. this film was exposed to 488 nm. radiation and optically developed, as shown in Table III.

TABLE III

| Film number | 1st radiation, 2% onset (nm.) | 2d radiation, 2% onset (nm.) | Required exposure net D=1 (ergs/cm.²) | Base plus fog |
|---|---|---|---|---|
| 1 | 730 | | 33 | .10 |
| 2 | 800 | | 103 | .14 |
| 3 | 730 | 800 | 22 | .14 |
| 4 | 704 | | 23 | .14 |
| 5 | 704 | 800 | 13 | .14 |
| 6 | 695 | | 27 | .16 |
| 7 | 695 | 800 | 15 | .14 |
| 8 | 750 | | 35 | .12 |
| 9 | 704 | 750 | 17 | .24 |
| 10 | 695 | 850 | 13 | .11 |
| 11 | 704 | 850 | 13 | .12 |
| 12 | 704 | | 29 | .09 |
| 13 | 704 | 840 | 20 | .12 |

Definition: 2% onset refers to the wavelength at which 2% of the radiation is transmitted through the filter. At longer wavelengths the filter transmits more radiation and at shorter wavelengths transmits less than 2% of the radiation falling on it.

Results similar to the results noted above were obtained with a wide variety of non-silver free radical photosensitive compositions including those of the types described in the twenty-seven patents listed in column 3 of U.S. Pat. 3,510,300 and other more recently described non-silver photosensitive compositions developed by Eugene Wainer and his coworkers, the disclosures of which are incorporated herein by reference.

From the results described above, it will be apparent that the use of two different wavebands for development permits development with a wider range and greater flexibility in terms of time, maximum density, gamma speed, and overall photographic response. The initial shorter waveband exposure appears to sensitize the system so that a longer wavelength waveband can be used for full development of the image.

This two waveband method of optical development is applicable to all optically developed non-silver organic free radical photosensitive compositions formulated with any of the following dye bases, including merocyanines, merodicarbocyanines, cyanines, carbocyanines, dicarbocyanines, tricarbocyanines, azacyanines, merocarbocyanines, azocarbocyanines, styryls, butadienyls, azostyryls, hexatrienyls and leuco compounds, such as leuco diphenylmethanes, leuco triphenylmethanes, xanthenes, selenoxanthenes, thioxanthenes, thiazines, oxazines, fluorenes, rhodamines, and phenoxazines, in compositions such as those described in the patents to which reference is made in U.S. Pat. 3,510,300 and in improvements thereon.

I claim:

1. In a process for rendering visible an image present in a non-silver organic free radical radiation sensitive medium containing an organic halogen compound in which at least three halogen atoms selected from the group consisting of Cl, Br and I are attached to a single carbon atom and containing a dye salt progenitor compound in which said image is present as a result of imagewise exposure of said medium to radiation of suitable wavelengths, the improvement which comprises:
exposing all of said radiation sensitive medium to two separate image developing exposure to radiation of two different wavelengths, the first exposure being a brief exposure to radiation of relatively shorter wavelength and the second exposure being to relatively longer wavelength radiation.

2. The process of claim 1 in which the first image developing exposure is to radiation which lies within the optical absorption band of at least one constituent of the image present in said radiation sensitive medium before said first image developing exposure.

3. The process of claim 1 wherein the first developing exposure is to visible red light and the second developing exposure is to light of longer wavelengths.

4. The process of claim 1 wherein the image forming radiation sensitive medium contains a styryl dye base and the first exposure is to radiation longer than about 610 nm. and the second exposure is to radiation longer than about 666 nm.

5. The process of claim 1 wherein the image forming radiation sensitive medium contains a vinylidene color-forming compound and the first exposure is to radiation longer than about 695 nm. and the second exposure is to radiation longer than about 800 nm.

References Cited
UNITED STATES PATENTS

| | | | |
|---|---|---|---|
| 3,510,300 | 5/1970 | Fotland | 96—27 |
| 3,152,902 | 10/1964 | Jacobs | 96—48 |
| 3,147,117 | 9/1964 | Wainer | 96—48 |
| 3,042,519 | 7/1962 | Wainer | 96—90 |
| 3,121,633 | 2/1964 | Sprague et al. | 96—48 |

NORMAN G. TORCHIN, Primary Examiner

E. C. KIMLIN, Assistant Examiner

U.S. Cl. X.R.

96—48, 90